Feb. 8, 1949.     E. B. HOPPE     2,460,885
MULTIPLY PASTED END BAG WITH SEALED INNER PLY
Filed Dec. 9, 1944     4 Sheets—Sheet 1
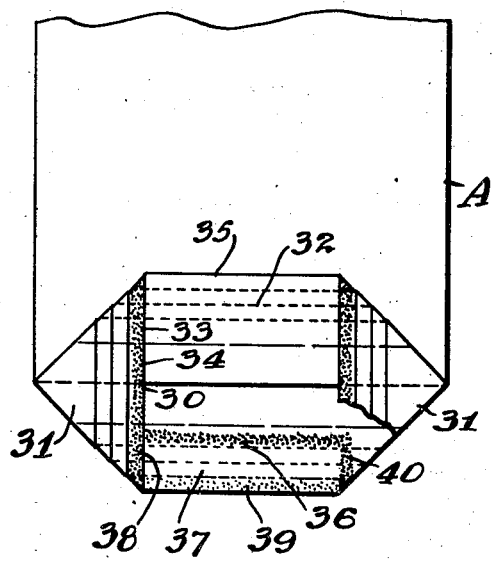
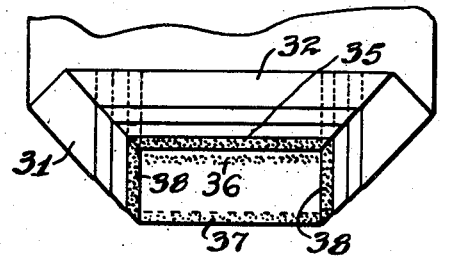
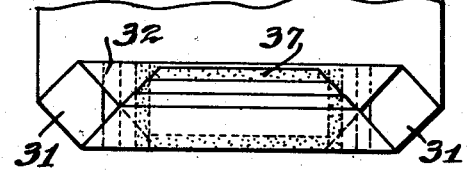
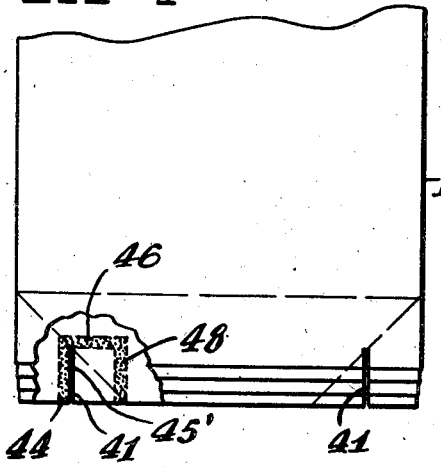
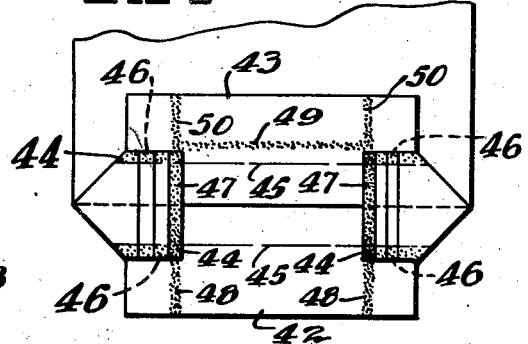
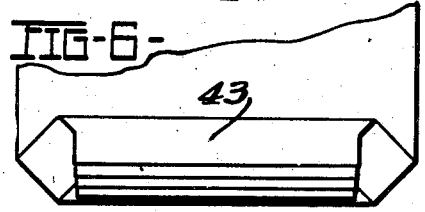
Inventor
EDGAR B. HOPPE
By Owen & Owen
Attorneys Feb. 8, 1949.   E. B. HOPPE   2,460,885
MULTIPLY PASTED END BAG WITH SEALED INNER PLY
Filed Dec. 9, 1944   4 Sheets-Sheet 2
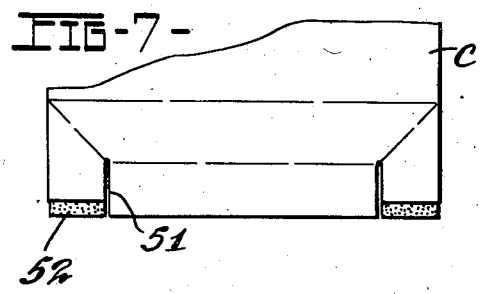
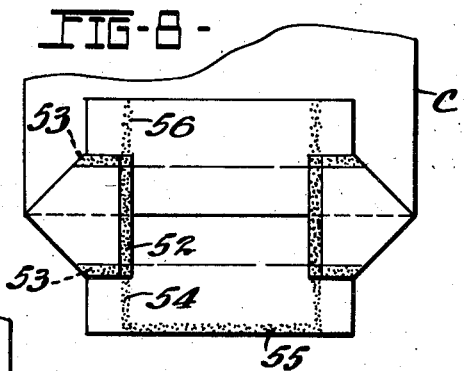
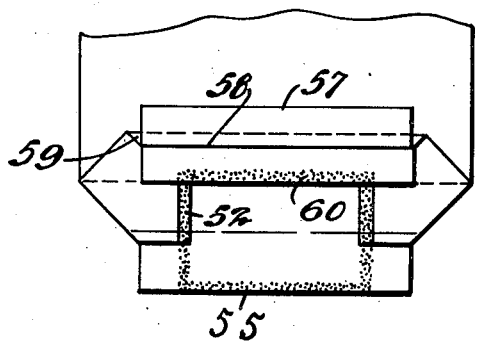
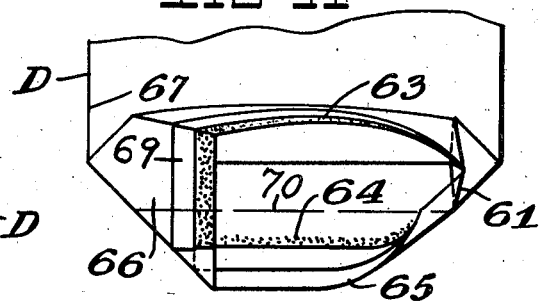
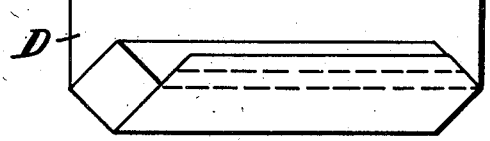
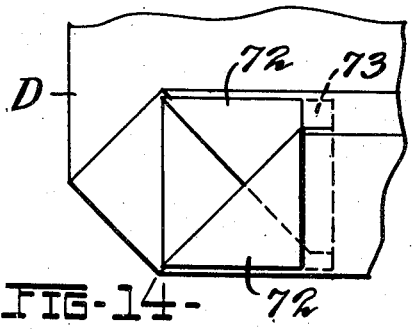
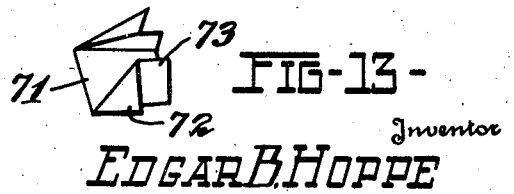
Inventor
EDGAR B. HOPPE
By Owen & Owen
Attorneys

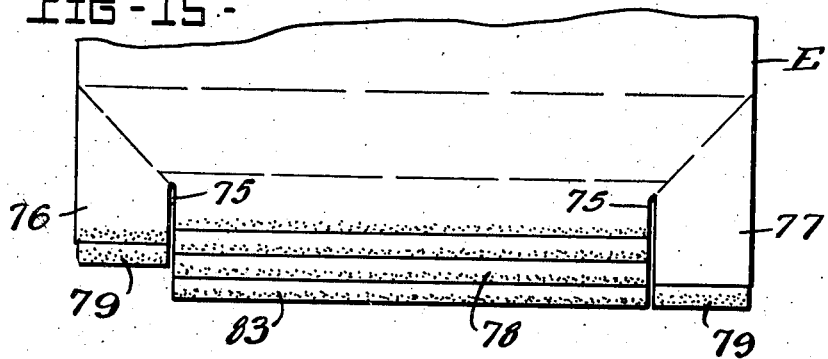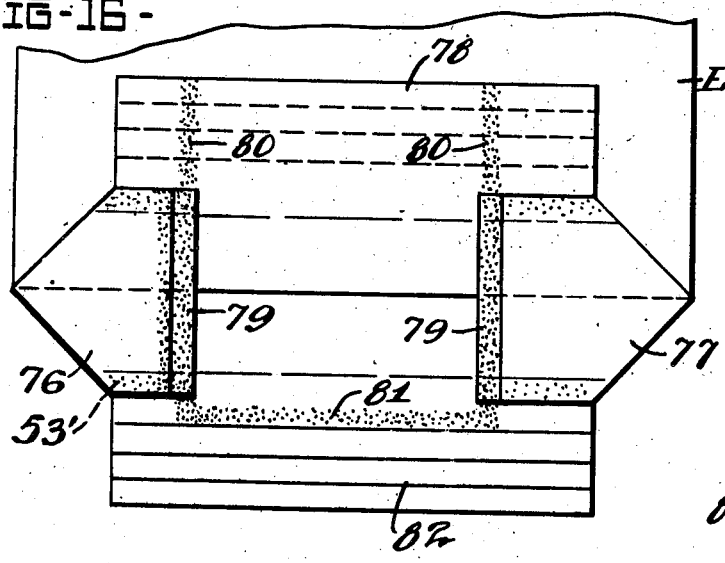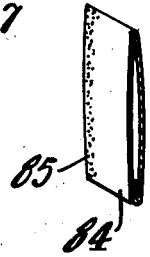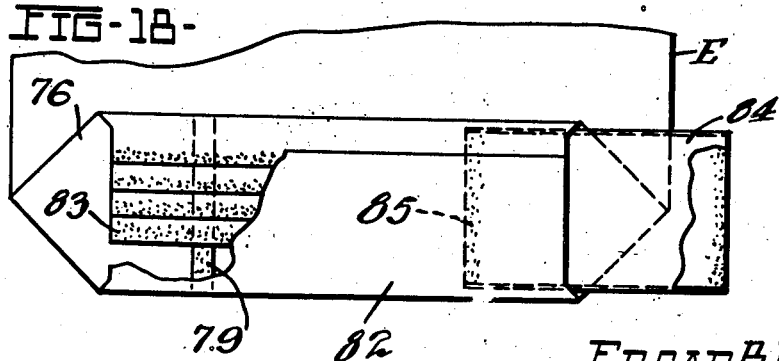

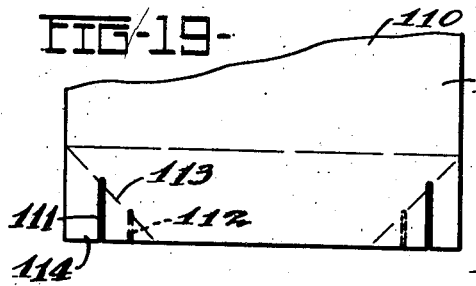
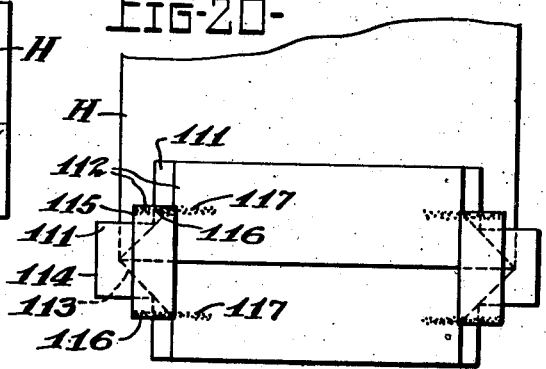
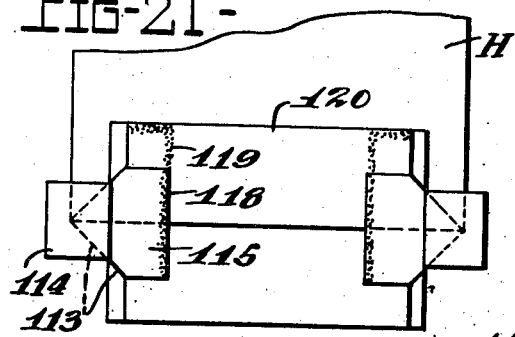
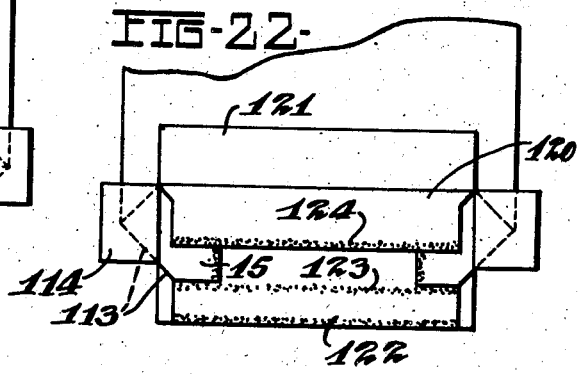
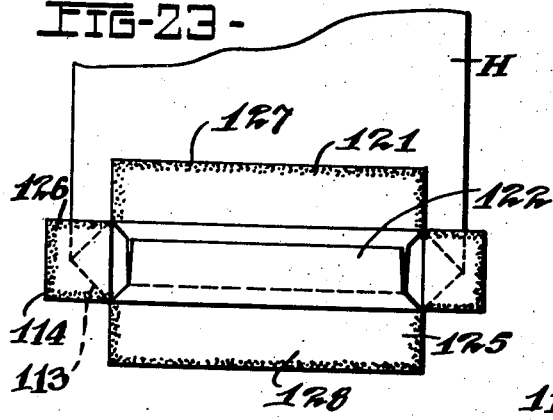
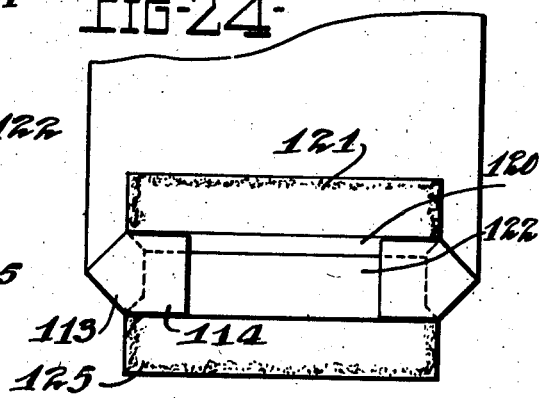

Patented Feb. 8, 1949

2,460,885

UNITED STATES PATENT OFFICE 2,460,885

MULTIPLY PASTED END BAG WITH SEALED INNER PLY

Edgar B. Hoppe, New York, N. Y., assignor to St. Regis Paper Company, New York, N. Y., a corporation of New York Application December 9, 1944, Serial No. 567,427

2 Claims. (Cl. 229—59)

This invention relates to a multiply pasted end bag with a sealed inner ply. The purpose of the invention is to provide a bag of this type with an inner ply which may prevent the contents of the bag from contacting any portion of any ply except the inner ply and which may exclude access from the exterior of the bag through the inner ply. For some purposes it is desirable to have the inner ply water-proof, for other purposes acid-proof, or to otherwise resist injurious action by the contents of the bag or damage to the contents of the bag from any conditions exterior to the bag. It is frequently desirable to have the contents thus securely sealed within a ply which may be suitably treated to contain and protect the contents for which the bag is intended, while outer plies may provide strength without necessarily having such special treatment.

Where a multiply bag is closed by adhesive the usual type of closure is such that outer plies are exposed to the contents of the bag at some point in the closure. It is an object of the present invention to form such a closure in a way that will completely seal the inner ply and prevent any access of the contents of the bag to any ply except the inner ply.

For practical purposes, it is frequently advantageous to apply a compound to the inner ply before it is formed into a bag tube, which compound will quickly dry so that it will not interfere with the usual tube forming operations and may be rendered adhesive by the application of heat when it is desired to seal the bag. Some of the materials suitable for this purpose may be welded together under heat but do not readily adhere after having been dried, to some kinds of paper which might be desirable for the inner ply. Under such circumstances, the adhesive should be applied to both faces where they are to be united. Where the type of adhesive employed is such that it will readily adhere to both faces which are to be united, the one strip of adhesive along the line of union is sufficient. And while the preliminary application and drying of the adhesive prior to the formation of the tube is frequently the most practical method of applying the adhesive, this application is concerned with the manner of sealing the inner ply rather than with the particular manner in which the adhesive is placed in the locations where desired.

The invention is capable of being applied to bag closures of many different specific forms, a few of which will be described in detail, so that the principle of the invention can be readily understood. In the accompanying drawings forming a part of this specification—

Fig. 1 shows one form of a bag end, partly broken away, and opened preparatory to folding.

Fig. 2 shows the bag end of Fig. 1 with one side flap folded over.

Fig. 3 shows the bag end of Fig. 1 in its closed position.

Fig. 4 shows the end of a bag tube, partly broken away and prepared to make another form of closure.

Fig. 5 shows the bag end of Fig. 4 opened up.

Fig. 6 shows the bag end of Fig. 4 closed.

Fig. 7 shows the end of a bag tube prepared to make a third form of closure.

Fig. 8 shows the bag end of Fig. 7 opened up.

Fig. 9 shows the bag end of Fig. 7 partly closed.

Fig. 10 shows the end of a bag tube prepared to make a fourth form of closure.

Fig. 11 shows the bag end of Fig. 10 partly opened.

Fig. 12 shows the bag end of Fig. 10 closed.

Fig. 13 shows a partly folded valve sheet adapted to form a valve sleeve in the bag end shown in Fig. 10.

Fig. 14 shows a corner of the closed end of Fig. 12 with a valve in place.

Fig. 15 shows a bag tube end prepared to make a fifth form of closure.

Fig. 16 shows the opened bag end of Fig. 15.

Fig. 17 shows a valve sleeve for the bag end of Fig. 15.

Fig. 18 shows the bag end of Fig. 15 closed, partly broken away, and with the valve sleeve in place.

Fig. 19 shows the end of a bag tube prepared to make a sixth form of closure.

Fig. 20 shows the tube end of Fig. 19 with both side flaps and end flaps turned out.

Fig. 21 is similar to Fig. 20, but with the inner plies of the end flaps turned in.

Fig. 22 is similar to Fig. 21, but with the inner ply of one side flap folded in.

Fig. 23 is similar to Fig. 22, but with the inner plies of both side flaps folded in to complete the closure of the inner ply.

Fig. 24 is similar to Fig. 23, but with the outer plies of the end flaps folded in.

For convenience, the six types of bag ends shown will be designated by the letters A to F inclusive.

It will be understood that the figures showing each embodiment illustrate only one end of a bag in each case. In the case of bottom ends it will be understood that the inner ply at both corners is to be completely sealed in accordance with the invention. The features of the invention may be applied to the bottoms of bags, the tops of which are open-mouthed, or if desired in each case the features of the invention may be applied to the top end of the bag, in which event, if it is a valve bag, the inner ply at one top corner will be completely sealed, whereas at the other top corner there will be a valve having a sleeve, the outside surfaces of the inner end of which will be sealed in place, for example, in the manner indicated in Fig. 18. It will be understood that the term "pasted end bag" has reference to bags, the end closures of either or both ends of which are formed by using paste or adhesives of the character above referred to for suitably securing the plies of the end flaps together.

In form A, shown in Figs. 1, 2 and 3, the bag is made from a multiply tube, indicated as being four ply, and the ends are stepped, each inner ply projecting farther than the next outer ply. According to this invention, adhesive is applied so as to form a complete sealed enclosure of the inner ply 30. For this purpose, a suitable sealing adhesive is applied on the ends of ply 30 across the end flaps 31, as indicated by dots on Fig. 1. When the inner side flap 32 is folded down, as shown in Fig. 2, the sealing adhesive on the inner ply at the end 33 of the side flap contacts the inner ply of the end flap at 34 and seals the inner ply at this point. In order to complete the seal at the edge 35 of the inner side flap 32, there is provided a line of adhesive 36 near the fold line of outer side flap 37, and this seals the inner ply of the outer flap to the end of the inner ply of the inner flap when the outer flap is folded into the position in which it is shown in Fig. 3.

In order to hold the outer flap in folded position, adhesive is applied also at 38 on the end flaps and 39 on the outer side flap. The last mentioned adhesive need not be the same kind as the adhesive at 33 and 36, and could be applied to the outer side of the inner side flap when folded into the position in which it is shown in Fig. 2, but that would require a separate applying operation.

In this case, as in each of the following forms, the complete sealing of the inner ply by adhesive suitable for the purposes of the sealing is the important point, and it will be understood, without repetition in each case, that additional adhesive may be applied wherever necessary to hold all plies in their final closing relation. Also, while in most instances there is shown a strip of adhesive applied to the face of each ply where they are to be sealed together, it will depend upon the nature of the adhesive and of the sheet to be sealed whether the adhesive needs to be applied to one or both of the meeting faces, as indicated above.

In order to complete the sealing of the inner ply so that material cannot escape between the portion 38 of the inner ply and the inner ply of the outer side flap, there is provided adhesive at 40, as shown at the broken away part of Fig. 1. This completes the sealing of the inner ply so that material cannot escape at any point to come into contact with any other ply.

In form B, shown in Figs. 4, 5 and 6, the bag tube is like that shown in form A except that there are slits 41 cut longitudinally of the bag and deeper than the stepped portion of the bag end. The bag end of this form is opened as shown in Fig. 5, then inner side flap 42 is folded up and finally outer side flap 43 is folded down.

Slits 41 are positioned so that, when the bag end is opened the edges 44 of the end flaps, where they border the slits, extend beyond the lines 45 about which the side flaps are folded. The inner surfaces of these extended edges 44 are adhered to the inner ply of the contacting side flap. This adherence may be by adhesive applied at 45' or at 46 or at both places, as shown where Fig. 4 is broken away. Adhesive may be applied also to the extending stepped ends of the inner ply of the end flaps as shown at 47 on Fig. 5, and adhesive may be applied also to the inner ply of the inner side flap 42, as shown at 48, where it folds onto the inner ply of the end flaps. Adhesive is applied also along line 49 to the inner ply of flap 43 where it overlies the stepped end of the inner ply of flap 42 in the closed bag end. Preferably adhesive, not shown, is provided also on the outer side of the inner ply of inner side flap 42 where it contacts adhesive along line 49.

In form C, shown in Figs. 7, 8 and 9, there are slits 51, similar to slits 41 in form B. However, in form C the side flaps are not stepped, although the end flaps are stepped and the outside of the inner ply is coated with adhesive as indicated at 52. The edges of the end flaps are adhered at 53, in the same manner, as described at 46 for form B, and adhesive is applied at 54 and 56 in extension of line 52 as shown in Fig. 8, and at the inner edge of one inner ply, as indicated at 55. After the other side flap is folded down, its outer ply 57 is folded back, as shown in Fig. 9. This folding back is along line 58, in line with the bottom of the slits 51, so as not to tear the material at 59. Thereafter the line 55 of adhesive may be superposed upon adhesive 60 on the outside of the inner ply, thereby completing the sealing of the inner ply. Finally, flap 57 may be folded down to complete the bag closure.

In form D, shown in Figs. 10 to 14 inclusive, the ends of the bag tube are stepped with the inner ply the longest on the upper side of the tube as shown in Fig. 10, and with the outer ply the longest on the under side of the tube. The corner is cut off slantingly at 61 to form a notch when the bag end is opened, as shown in Fig. 11. Adhesive is applied at 62 to the outside of the extended inner ply of side flap 63 and at 64 to the inside of the short inner ply of side flap 65. At the notched corner 61 and all along the bag end, to end flap 66, these two lines of adhesive contact each other when the bag end is closed, and seal together the inner ply of the bag. If desired, both corners could be formed as shown at 61, but in the form shown there is to be a valve, and for this purpose the end flap 66 is formed at one corner. At this corner, the extension of the inner ply is contined around the side fold 67 to line 68. The resultant extended inner ply of the end flap is covered with adhesive on the outside, as a continuation of adhesive 62, and where it extends at 69 beyond the base line 70 of side flap 65 it is adhered to the inner ply of the side flap. In this way, a complete seal of the inner ply would result if there was to be no valve, and this type of closure could be used at the other corner, instead of that shown at 61, if desired.

In this form, as in the form shown in Fig. 1 and other closures where there are no slits, the adhesive necessary to complete the sealing of the inner plies of the end flap and side flap beyond the base fold line of the side flap, as at 69 in Fig. 11, must extend from said base line where it crosses the edge of the end flap to the diagonal fold line, and may follow the edge of the end flap, as at 40 in Fig. 1, or the fold line, as at 46 in form B, or may be along any line intermediate between these.

In form D, as shown, there may be used a valve sheet 71 which may extend entirely across end flap 66 when that is opened fully. Corners 72 may be folded down outside of the side flaps, and the edges at 73 left to complete a sleeve, or corners 72 might be left unfolded and might be united to extend the sleeve structure. In either case, the inner end of the valve sleeve is united to the inner ply of the bag, so that there is no opportunity for the contents of the bag to contact any ply of the bag except the inner ply. The sleeve may be of the same material as the inner ply.

In form E, shown in Figs. 15, 16, 17 and 18, there is shown another type of closure in which a valve may be used if desired. The slide flaps are stepped in the same manner as described in form D, but this form of stepping extends only to slits 75. The inner ply extends farther than the other plies of each end flap, but one end flap 76 is shorter than the side flaps while the other end flap 77 extends the same as the inner side flap 78. The outside of the inner ply of each end flap is provided with adhesive at 79 where it extends beyond the other plies, and when the bag is opened, as shown in Fig. 16, the line of adhesive is extended at 80 on the inside of the inner ply of the inner side flap. Adhesive is applied also at 81 along the inside of the edge of the inner ply of the outer side flap 82, and at 83 to the outer side of the inner ply of inner side flap 78 where it will underlie the adhesive 81 on the outer side flap. In this way the inner ply is completely sealed, so that material within the bag could not contact other plies.

When a valve is desired, a sleeve 84 may be formed, as shown in Fig. 17, and this could have adhesive applied on the outside of one end, as indicated at 85. The sleeve may be positioned in the open bag end so that its line of adhesive 85 contacts the adhesive lines 79, 80 on the bag walls when the end is closed. Adhesive is applied also between the inner ply of the end flap and the side flap, as indicated at 53′; in the same way as at 53 in form C. In this way, the material in the bag can contact only the inner ply and the sleeve, and not the other plies of the bag. The sleeve may be closed or not, as preferred, after the bag has been filled.

In this way it will be seen that the inner ply forms a completely sealed container. Other adhesive may be applied to hold the plies of the flaps in place, but this is for the usual purposes and does not affect the sealing of the inner ply.

In form F, shown in Figs. 19 to 24 inclusive, there is shown a duplex bag with the ends of both plies cut off even across the tube 110. However, the end is provided with a slit 111 in the outer ply and a parallel slit 112 in the inner ply. These slits extend from the end of the tube to the slanting fold line 113 which divides the end flaps from the side flaps.

After the tube end is opened in the usual manner, the outer ply 114 of the end flap is folded out about a line joining the ends of slits 111, and the inner ply 115 of the end flap is folded out about a line joining the ends of slits 112, as shown in Fig. 20. Adhesive may then be applied at 116 along edges of ply 115, and at 117 to the inner ply of the side flaps. The flaps 115 may then be folded in as shown in Fig. 21. Adhesive 119 may be applied to the inner side flap 120 at any convenient time before that flap is folded down, as shown in Fig. 22. The outer ply 121 is then folded back, as described in connection with ply 57 of form C, and adhesive may be applied to the inner ply of the outer side flap 122 at 123, the latter overlying line 124 on ply 120 when the inner ply of the outer side flap is folded as shown in Fig. 23. The inner ply is then completely closed, as shown in Fig. 23, and any suitable adhesive may be applied at 126 to end flap plies 114, and to outer plies 121 and 125 of the side flaps along lines 127 and 128. The end flaps of the outer ply may then be folded in, as shown in Fig. 24, and finally the side flaps of the outer ply may be folded in to complete the closure.

From the foregoing description it will be seen that the object of completely sealing the inner ply of a multiply pasted end bag may be achieved by numerous variations, and other changes in details may be made within the scope of the invention as defined in the appended claims. However, it will be noted in each instance there are two side flaps which are folded so that the inner surface of the inner ply of one overlies and adheres to the outer surface of the inner ply of the other. This form of adhesive closure is much stronger than in a type where the inner surfaces of the two sides of the bag are brought together and sealed, because in that case any separating stresses must be taken up along a single line of the adhesive at one time, while in the overlapping form the full strength of the entire sheet of adhesive resists spreading stress.

Also, where the end flaps and side flaps join, secure sealing requires adherence of the inner face of the end flap to the inner face of the side flap along a line extending continuously from where the fold line of the side flap crosses the edge of the end flap to the fold line where end flap and side flap meet. Both these features are obviously present in all forms disclosed except form D, where no end flap is shown at the right of Fig. 11. In my co-pending application Serial No. 713,801, filed December 3, 1946, I have disclosed and claimed specifically another example which may embody the invention hereof.

What I claim is:

1. In a plural ply pasted end bag having a corner closure construction in which the inner ply is completely sealed, the construction at such corner comprising an inturned end flap adjoining along diagonal fold lines a pair of overlapping side flap portions which are folded in respectively along base fold lines, the inner portion of said end flap being divided from the side flaps by slits which when the side flaps are open, are positioned along outside said base fold lines so that the sides of said end flap extend out beyond said base fold lines and are folded in along such lines when the side flaps are folded in, lines of adhesive extending respectively continuously along the lengths of said slits on the inner surface of the inner ply of said end flaps and adhered to the inner surfaces of the inner plies of said side flaps, the inner ply of said end flap extending inwardly beyond the other ply or plies thereof, and a line of adhesive extending continuously from side to side of the end flap inner ply on the outer surface of its extending portion, said latter line of adhesive being adhered continuously along its length to inner ply flap portions which are folded over in contact therewith, whereby said lines of adhesive completely seal the inner ply of the corner construction against access of material in the bag to the other ply or plies.

2. In a plural ply pasted end bag having a corner closure construction in which the inner ply is completely sealed, the construction at such corner comprising an inturned end flap adjoining along diagonal fold lines a pair of overlapping side flap portions which are folded in respectively along base fold lines, the inner portion of said end flap being divided from the side flaps by slits which when the side flaps are open, are positioned along outside said base fold lines so that the sides of said end flap extend out beyond said base fold lines and are folded in along such lines when the side flaps are folded in, lines of adhesive extending respectively continuously along the lengths of said slits on the inner surface of the inner ply of said end flap and adhered to the inner surfaces of the inner plies of said side flaps, the inner ply of said end flap extending inwardly beyond the other ply or plies thereof, a line of adhesive extending continuously from side to side of the end flap inner ply on the outer surface of its extending portion, said latter line of adhesive being adhered continuously along its length to inner ply flap portions which are folded over in contact therewith, said side flaps having stepped ends, the inner ply of the underlying side flap protruding beyond the outer ply of plies thereof, and the inner ply of the overlying side flap being shorter than the other ply or plies thereof and having a line of adhesive on its inner surface adhered to the outer surface of the protruding portion of the inner ply of said underlying side flap.

EDGAR B. HOPPE.

REFERENCES CITED

The following references are of record in the file of this patent:

UNITED STATES PATENTS

| Number | Name | Date |
| --- | --- | --- |
| 1,821,207 | Cornell | Sept. 1, 1931 |
| 1,960,929 | Taggart | May 29, 1934 |
| 1,971,625 | Shively | Aug. 28, 1934 |
| 2,073,222 | Robinson | Mar. 9, 1937 |
| 2,100,828 | Winskill | Nov. 30, 1937 |
| 2,157,392 | Williams | May 3, 1939 |
| 2,176,499 | Hoppe et al. | Oct. 17, 1939 |
| 2,232,497 | Tooker | Feb. 18, 1941 |
| 2,266,905 | Potdevin | Dec. 23, 1941 |

Certificate of Correction

Patent No. 2,460,885.                                                               February 8, 1949.

EDGAR B. HOPPE

It is hereby certified that errors appear in the printed specification of the above numbered patent requiring correction as follows:

Column 4, line 61, for "contined" read *continued*; column 6, line 30, for the word "adhesive" read *adhered*; line 67, claim 1, for "flaps" read *flap*; column 8, line 5, claim 2, for "ply of" read *ply or*;

and that the said Letters Patent should be read with these corrections therein that the same may conform to the record of the case in the Patent Office.

Signed and sealed this 14th day of June, A. D. 1949.

[SEAL]

THOMAS F. MURPHY,
*Assistant Commissioner of Patents.*